Aug. 23, 1932.  J. M. MITCHELL  1,873,138
VALVE STRUCTURE
Filed Sept. 24, 1930
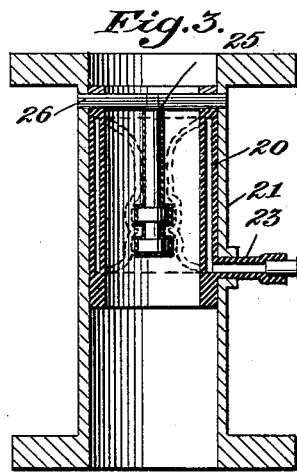
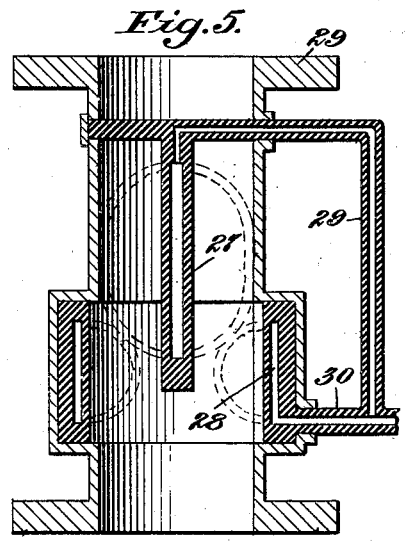
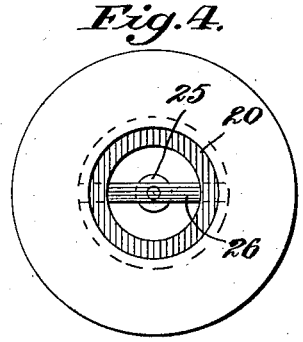
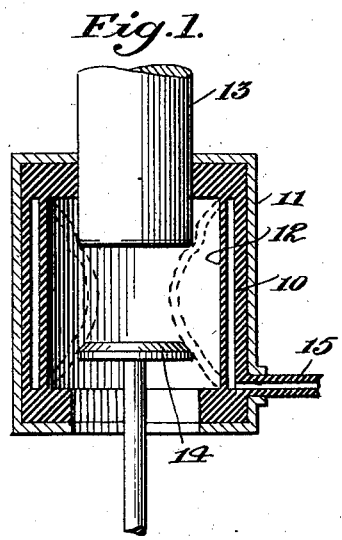
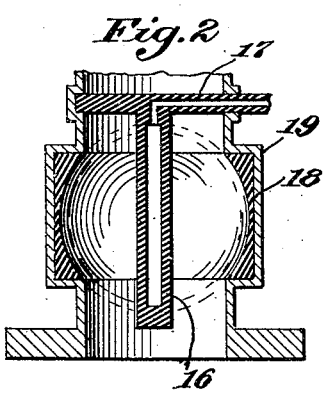
Inventor:
James Macdonald Mitchell,
Morrison, Kennedy & Campbell
Att'ys.

Patented Aug. 23, 1932

1,873,138

UNITED STATES PATENT OFFICE

JAMES MACDONALD MITCHELL, OF FLUSHING, NEW YORK

VALVE STRUCTURE

Application filed September 24, 1930. Serial No. 484,183.

This invention relates to valve structures and concerns particularly a device of that type wherein a pneumatic inflatable member cooperating with a suitable seat may be utilized in connection with pipes and other conductors to regulate the flow of fluids therethrough.

It has heretofore been the practice to utilize metallic valves of various types to control the flow of fluids such as gas, water and acid through pipes. The disadvantages of the use of a metallic valve in addition to their relatively high cost of construction are that the valve parts may be oxidized, corroded or eaten away by the fluid, and any hard foreign substances which may become lodged between the valve members may prevent their opening or closing, with the result that the valve becomes useless until replaced or repaired.

It is the principal object of this invention to provide a valve structure which may be utilized to regulate the flow of fluids such as liquids and gases through pipes, wherein the pressure is not excessive, which has all the advantages so far as efficiency is concerned as metallic valves but which does not have the above enumerated disadvantages. Specifically, I propose to utilize an expansible member, preferably of rubber, in the nature of an inflatable bulb or annular ring which is so associated with respect to a pipe and/or a suitable seat therein that the same, when expanded by means of any suitable fluid such as water or air, will serve to stop flow through the pipe, and which when the expanding fluid is released will become deflated to allow flow. To control such an expansible valve, and to inflate the same, a simple hand pump or any suitable source of fluid under compression may be utilized.

In constructing an expansible valve of the desired type various forms of expanding members may be utilized, either singly or plurally, and various types of seat may be arranged with respect to the expanding member and the pipe with which the structure is to operate so as to efficiently control the flow of the liquid or gas therethrough. It will, of course, be obvious that the present type of valve will be particularly suited to be used in connection with pipes of small or medium diameter wherein the pressure is relatively low or such as to constitute what may generally be termed as a medium head.

Inasmuch as rubber possesses many desirable characteristics such as expansibility and immunity to the corrosive action of water or the destructive action of acids, I deem it preferable to utilize such a material in constructing the inflatable portion of my valve. The thickness of the material to be used will be determined by the size of the member to be constructed and the elasticity should be such as to render the member freely expansible without being subjected to adverse dilation or distortion by the pressure of the fluid in the pipe or conduit with which the valve is to be utilized. Except where the pressure is relatively low I deem it desirable to employ rubber having incorporated therein some reinforcing substance such as fabric.

While, of course, it is possible merely to have the inflatable member cooperate with the walls of the pipe to stop the flow, a more efficient structure will result from disposing a suitable seat also made of rubber or some similar yielding material in the pipe to cooperate with the expanding member.

In the accompanying drawing I have illustrated several embodiments of my invention having the above-described characteristics. It will be understood, however, that the invention is capable of a wide range of modification and equivalency both with respect to size, form and shape without departing from the spirit and scope thereof as determined by the appended claims.

In the drawing:

Fig. 1 shows one adaptation of my invention wherein an expansible member is associated with the end of a pipe to regulate flow therethrough;

Fig. 2 shows another form of my invention wherein an expansible member cooperates with a suitable seat associated with a pipe to regulate flow through the latter;

Fig. 3 illustrates a third embodiment of my invention constituting a reversal and modification of the parts shown in Fig. 2;

Fig. 4 is an end view of the structure shown in Fig. 3; and

Fig. 5 illustrates still another embodiment of my invention wherein a plurality of expansible members cooperate with each other.

Referring now to the drawing, I have in Fig. 1 shown a structure comprising an expansible member in the nature of a hollow annular ring 10 including a thick and relatively rigid outer wall 11 and a thin expansible inner wall 12 arranged with respect to the end of a pipe 13 and a metallic valve seat 14 permanently positioned with respect to the pipe so that when an inflating fluid is introduced between the walls of the expansible member, as by means of a conduit 15, the inner wall 12 will be expanded inwardly to the position shown in dotted lines to engage the pipe end and the seat and thus close the pipe. When the pressure of the fluid in the expansible member is released the expansible member 12 will return to its normal position, due to its own elasticity and the pressure within the pipe, to permit flow from the pipe past the valve seat.

In Fig. 2 I have shown an expansible member 16 in the form of a bulb or an elastic elongated rubber tube closed at one end and connected at the other end through a suitable conduit 17 with a source of compressed fluid. Associated with the interior of the pipe and preferably in an enlarged portion thereof such as indicated by the numeral 18 is a circumferentially extending ring 19 constituting a valve seat and preferably possessing some degree of elasticity and also, and as shown, having an arcuate cross-section such as will conform to the outer surface of the expansible member 16 when the same is in the expanded position indicated in dotted lines. It will be understood that a structure of this type may be positioned at any suitable point in a pipe line and serve admirably to regulate the flow of fluids and like substances therethrough. Due to the expansible characteristic of material such as rubber of which I prefer to construct the member 16, and the elastic quality of fluids such as air and water with which I propose to inflate the same, it will be understood that if a foreign matter such as pebbles or pieces of pipe lining should become lodged in the valve seat 19, the expansible member would readily associate itself with the valve seat around such foreign matter, with the result that a greater efficiency is obtained than results from the use of various types of metallic valve and it is practically impossible for the valve to become inoperative.

In Fig. 3 an expansible member 20, of the type shown and described in connection with Fig. 1, is associated with the inner surface of a pipe 21 in such manner that when compressed fluid is introduced into the expansible member through a suitable connection such as a conduit 23 associated with a fluid compressor 24, the inner wall of the expansible member will move inwardly at all points to cooperate with a seat 25 extending longitudinally of the pipe and being of sufficient circular cross-section as to form a fluid tight connection with the wall of the expansible member. The valve seat 25, as shown in Fig. 4, may be conveniently disposed in the pipe by means of a transversely extending arm or pin 26, which is anchored in the wall of the pipe. To insure better cooperation with the wall of the expansible member, the seat may have a rubber surface.

For the purpose of illustration, I have indicated a hand operated pump 24 controlled by a stop-cock 30 as being suited to conveniently inflate my valve structure. It will be understood that this device is merely illustrative and that any convenient source of compressed fluid and any convenient mechanism for regulating the flow of the inflating fluid to and from the valve structure may be utilized.

In Fig. 5 I have shown a still further modification of my invention wherein, instead of utilizing a single expansible member to cooperate with a valve seat associated with a pipe, two expansible members 27 and 28 of the type shown and described respectively in connection with Figures 2 and 3 are positioned in a pipe 29 so that when an inflating fluid from any suitable source is introduced into the several inflatable members through conduits 29 and 30 the member 27 will expand outwardly to meet the inwardly expanding wall of the member 28. It will also be noted that a tight connection may further be insured by arranging the outwardly expansible member 27 so as to also seat against the inner surface of the pipe. Further, as illustrated, the conduits 29 and 30, through which the inflating fluid is supplied to the several expansible members, are connected together so that the expansible members may be simultaneously expanded. It will be obvious, of course, that the several conduits may be associated independently with the source of inflating fluid or with different sources of inflating fluid so that the several expansible members may be actuated successively, or, when desired, only the expansible member 27 may be utilized.

From the above description of various forms of my valve structure, it will be evident to those skilled in the art that I have provided a new and useful regulating means of simple and cheap construction which will efficiently serve to regulate the flow of gases, liquids, liquids containing solids in suspension, acids and like substances, which posssess numerous advantages over any of the various types of metallic and other type valve structures heretofore known in the art. As above pointed out the invention is particularly adapted for utilization in pipe lines having a low or medium head, but it will be appreciated that by the use of sufficiently strong material embodied in a structure of suitable size and shape the invention is capable of utilization in pipes where a relatively high pressure exists. Due to the simplicity of the structure it can not readily become inoperative, and its efficiency in operation will not be impaired by the presence of foreign matter in the pipe. Furthermore, since rubber, of which I prefer to construct my device, does not corrode, is not subject to the influence of acids, and possesses a high degree of durability and resistance to erosion, the structure has a long life and, therefore, will require a minimum of replacement.

I claim:

1. In combination with a pipe, a valve structure comprising an inflatable member, and a valve seat permanently positioned with respect to the pipe so as to contact and engage with the inflatable member when the member is in expanded position.

2. In combination with a pipe, a valve structure comprising an inflatable member, and a yielding valve seat permanently positioned with respect to the pipe so as to contact and engage with the inflatable member when the member is in expanded position.

3. In combination with a pipe, a valve structure comprising an elastic and inflatable member, and a valve seat permanently positioned with respect to the pipe so as to contact and engage with the inflatable member when the member is in expanded position.

4. In combination with a pipe, a valve structure comprising an elastic and inflatable member, and a yielding valve seat permanently positioned with respect to the pipe so as to contact and yieldingly engage with the inflatable member when the member is in expanded position.

5. In combination with a pipe, a valve structure comprising an inflatable bulb, and a valve seat permanently positioned with respect to the pipe so as to contact and engage with the bulb when the bulb is in expanded position.

6. In combination with a pipe, a valve structure comprising an inflatable member having an expansible wall and a rigid wall and a valve seat permanently positioned with respect to the pipe so that the seat will contact and engage with the expansible wall when the member is inflated.

7. In combination with a pipe, a valve structure comprising an inflatable annular ring, and a valve seat permanently positioned with respect to the pipe so as to contact and engage with the ring when the ring is in expanded position.

8. In combination with a pipe, a valve structure comprising an inflatable annular ring including an expansible wall and a rigid wall and a valve seat, the several parts being permanently positioned with respect to the pipe so that the expansible wall of the ring will contact with and engage the seat when in expanded position.

In testimony whereof, I affix my signature.

JAMES MACDONALD MITCHELL.